United States Patent [19]
Jennings et al.

[11] Patent Number: 5,169,615
[45] Date of Patent: Dec. 8, 1992

[54] PROCESSES FOR REMOVING CYANIDE FROM MILL TAILINGS

[76] Inventors: Melvin A. Jennings, 1771 Three Mile Dr., Reno, Nev. 89509; Robert D. Lear, P.O. Box 657, Shelton, Wash. 98584

[21] Appl. No.: 605,747

[22] Filed: Oct. 30, 1990

[51] Int. Cl.$^5$ ............... C22B 11/08; C01C 3/02; C01C 3/08
[52] U.S. Cl. .................... 423/377; 75/737; 423/29; 423/30; 423/31; 423/379
[58] Field of Search ......... 423/29, 30, 31, 379, 423/377; 75/737

[56] References Cited

U.S. PATENT DOCUMENTS

| | | | |
|---|---|---|---|
| 705,698 | 7/1902 | Officer et al. | 423/30 |
| 718,633 | 1/1903 | Joseph | 423/31 |
| 823,576 | 6/1906 | Arnold | 423/30 |
| 1,178,081 | 4/1916 | Layng | 423/29 |
| 1,387,289 | 8/1921 | Mills et al. | 423/29 |
| 3,224,835 | 12/1965 | Hockings et al. | 423/30 |
| 4,537,686 | 8/1985 | Borbely et al. | 210/713 |
| 4,615,873 | 10/1986 | Devuyst et al. | 423/365 |
| 4,622,149 | 11/1986 | Devuyst et al. | 210/717 |
| 4,994,243 | 2/1991 | Goldstone et al. | 423/29 |
| 5,015,396 | 5/1991 | D'Orazio et al. | 75/737 |

OTHER PUBLICATIONS

Bray, Non-Ferrous Production Metalluray, John Wiley & Sons pp. 253, 254 and 261.

*Primary Examiner*—Wayne Langel
*Attorney, Agent, or Firm*—Dorr, Carson, Sloan & Peterson

[57] ABSTRACT

Mill tailings containing cyanide species can be treated with carbon dioxide in order to drive-off and/or recover the cyanide content of said tailings.

17 Claims, 1 Drawing Sheet

PROCESSES FOR REMOVING CYANIDE FROM MILL TAILINGS

BACKGROUND OF THE INVENTION

The processes of this patent disclosure are concerned with removal of cyanide species such as free cyanide, complex heavy metal cyanide, etc. from metal-containing industrial waste water effluents in general and from precious metal-containing mill tailing slurries in particular. Cyanides are of course widely used in recovering various precious and/or base metals from their ores. For example, gold and silver are often recovered by treating their ores with a cyanide solution in order to dissolve and separate the gold and silver values from the ore's gangue. Thereafter, the resulting gold and silver cyanide leach solution is further processed (e.g., by the addition of zinc, carbon or resin) to recover the precious metals. During the course of such recovery operations, cyanide ions are known to: (1) form complexes with a host of heavy metals (e.g., complexes having the general formula $[Me(CN)_x{}^{y-}]$), (2) remain in free form, and (3) take the form of certain related ionic species such as thiocyanates ($SCN^-$) and/or cyanates ($CNO^-$) Therefore, applicants' use of general terms such as "cyanide" and "cyanide species" are intended to include any and all chemical species which contain a cyanide ($CN^-$) group.

The methods employed to deal with cyanide-containing mill tailings have included: (1) oxidation by chemical and/or electrochemical means, (2) ion exchange and (3) so-called AVR (acidification-volatilization-regeneration) processes. All of these methods are operative, but, to some degree or other, each is hampered by various practical or economic disadvantages. Not the least of these is the high reagent costs normally associated with treating the huge quantities of aqueous effluents generated by precious metal mining operations. By way of example, chemical oxidation of those cyanide species contained in waste water effluents can be carried out with costly, strong oxidants such as chlorine gas, hypochlorite, ozone, peroxide, peroxysulfates and/or oxygen, usually with the aid of select catalysts. Of these processes, alkaline chlorination is perhaps the most commonly used oxidation process employed in the precious metal mining industry. Other potential oxidation agents such as peroxides and peroxysulfates are likewise very expensive reagents, especially when they are used in the context of the dilute cyanide solutions normally produced by mining operations. On the other hand, ozonation treatments of such effluents are particularly disadvantaged by their especially high capital and energy costs.

Many such oxidation processes also require costly catalysts for their efficient operation. By way of example, pressure oxidation processes require large amounts of nickel metal or activated carbon catalysts in order to effectively destroy the cyanide content of the subject effluent. They also require expensive pressure vessels. Electrolytical oxidation of such aqueous cyanide solutions also has been tried, but such processes involve the use of sophisticated electrolytic cells and, once again, very expensive capital equipment. Ion exchange methods have also been used in recovering metal values and cyanide, but their use has been hampered by high capital and operating costs and complicated by other chemical process problems. Moreover, virtually every one of the above noted HCN removal and/or recovery methods involves rather sophisticated chemical technologies. Consequently, careful control, of a kind not customarily available at remote mine sites, is a very real practical limitation to many of these processes.

In response to all of the above-noted problems various processes have been suggested wherein cyanide species contained in waste water effluents can be decomposed and/or recovered through the use of less expensive reagents and/or equipment. For example, U.S. Pat. No. 4,622,149 teaches reduction of cyanide, arsenic and antimony levels in an aqueous stream by adding ferric ion (in water-soluble form) to a cyanide containing effluent while treating it with gaseous $SO_2$ and oxygen in the presence of a soluble copper catalyst. The overall effect of this process is to decompose free and complex metal cyanide species and to precipitate arsenic and antimony in association with a ferric hydroxide precipitate.

U.S. Pat. No. 4,615,873 teaches a process for reducing cyanide levels in certain ferro-cyanide solutions. The precipitation is accomplished with the aid of certain metal reagents, other than copper, such as zinc, which are employed either prior to or simultaneously with, treatment of the ferro-cyanide solution with sulfur dioxide and air in the presence of a soluble copper catalyst.

U.S. Pat. No. 4,537,686 teaches removal of cyanide from aqueous solutions by a process which essentially comprises exposing the solution to a mixture of sulfur dioxide and air (or oxygen) in the presence of a water-soluble copper catalyst. The copper catalyst catalyzes the removal of free cyanide, complex heavy metal cyanide cyanate and/or thiosulfates. After the cyanide species are removed, other species are removed by continued treatment with sulfur dioxide and air (or oxygen) in the presence of another metal ion catalyst such as those of nickel, cobalt or manganese.

It should also be noted that those processes which are based upon injection of $SO_2$ gas into mill tailings, or which are based upon the use of sulfurous acid reagents, have yet another drawback. They must accept, and pay the economic consequences of, the fact that limestone is present in many ores and that limestone is reactive with $SO_2$. That is to say that any limestone present in a cyanide-containing aqueous or slurry effluent may have to be neutralized before the $SO_2$ can begin to neutralize the cyanide. Moreover, $SO_2$ is known to produce certain sulfur species which could possibly interfere with certain other precious metal recovery techniques, e.g., flotation and Merrill-Crowe processes. It also should be pointed out that even if limestone were not present in an ore, many of the above noted processes which introduce $SO_2$ gas into mill tailings in order to remove cyanide also employ limestone as the reagent of choice in achieving and/or controlling the pH of the processes. For example, the pH of the process taught by U.S. Pat. No. 4,537,686 is maintained between 5 and 6.5 by the use of limestone. Consequently, as in the case of an ore which contains limestone, any $SO_2$ gas which is introduced to recover cyanide will first react with such limestone reagent before any appreciable amounts of cyanide can be recovered.

Thus, any process which: (1) is capable of effectively removing cyanides from waste waters, (2) uses lower cost reagents, (3) does not need limestone to adjust pH levels, (4) is not in fact consumed by a limestone component of an ore and (5) can be carried out with relatively simple equipment having low capital and energy costs would be welcome in any industry having a need to treat cyanide-containing effluents and especially in those remote sites where precious metal mining operations often take place.

SUMMARY OF THE INVENTION

Waste water or slurry effluents containing cyanide species such as, for example, those cyanide complex species contained in mine tailings, slurries, or sulfide ore slurries from flotation processes can be treated for subsequent release into the environment by certain hereinafter disclosed processes. These processes are based upon introduction of carbon dioxide, as opposed to sulfur dioxide or sulfuric acid, into such cyanide-containing effluents. The essential mechanism employed by the herein proposed processes is that of double replacement reactions of the relevant ions in an aqueous solution of complex metal cyanides. Unlike the above noted processes based upon catalyzed oxidation with oxygen and sulfites (produced by introduction of $SO_2$ gas into the tailings slurry in the manner taught by U.S. Pat. Nos. 4,622,149; 4,615,873, and 4,537,686), which involve a single replacement of the cyanide component, the herein described double replacement reactions permit recovery of cyanide for repeated use. The underlying principle in such double replacement reactions is a change of ion "partners" in a mixture of free ions in solution.

Again, such reactions are to be contrasted with the previously noted prior art methods employing $SO_2$ gas wherein a new "partner" (e.g., a sulfite ion) drives off and destroys the previous ion partner. In applicant's processes, ion "partners" are exchanged and a new pair is selectively retired (precipitated) in a successful conclusion while the other new pair remains. By this method, an instantaneous ionic reaction takes place without energy involvement or the relatively poor kinetics of oxidation-reduction reactions. Thus, a comparison of the above-noted single and double replacement reactions could begin by considering that the $SO_2$ based single replacement reaction employs a dilute solution of the complex ions sodium, $Na^+$ and aurocyanide, $Au(CN)_2^-$ as the product obtained by leaching a gold bearing ore with an aqueous (ionized) solution of sodium cyanide according to the general reaction schemes:

$$NaCN \xrightarrow{H_2O} Na^+ + CN^- \text{ and } 2Na^+ + 2CN^- +$$

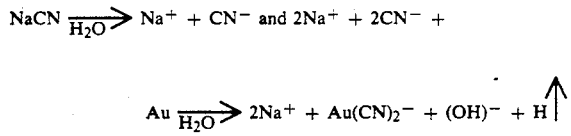

(see generally, Bray, Non-Ferrous Production Metallurgy, John Wiley and Sons, p. 253).

One can then, by the methods taught in the previously noted patents, selectively precipitate an insoluble salt of the single replacement reaction with sulfur dioxide as sulfurous acid ionized in an aqueous solution in the presence of air and copper, according to the general reaction scheme:

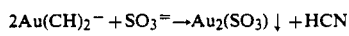

(see generally, Bray, p. 254 and p. 261).

Thus, gold in partnership with cyanide (a soluble compound) is singly exchanged with sulfite to form gold sulfite (an insoluble compound), while the cyanide is dissipated in very dilute form and is not recovered.

This single replacement reaction is to be contrasted with applicants' double replacement reaction wherein the aurocyanide solution reacts with carbon dioxide according to the general reaction schemes:

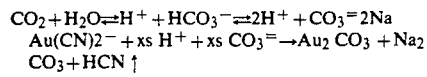

(note: xs = excess and $\Delta$ = warm water)

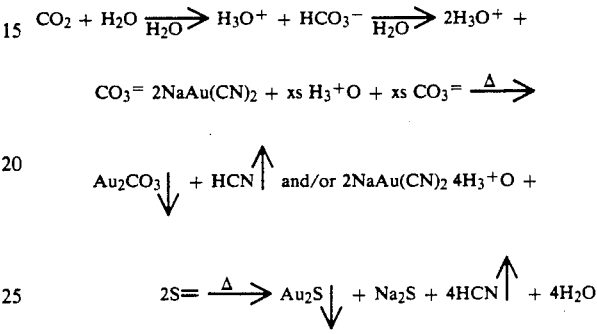

in which excess hydrogen and carbonate ions trade places with sodium and aurocyanide ions to form insoluble gold carbonate. The dilute sodium carbonate can be discarded since it is of negligible worth. The hydrogen and cyanide ions will unite to form hydrogen cyanide gas which can be recovered from the off gases from the reaction and thereafter recovered in an alkaline solution (e.g., NaOH) for further use in such precious metal recovery operations. Such recovery of course implies that the cyanide will not enter the environment.

Stated in broad process terms, the herein disclosed processes for removing, say, a metal cyanide complex from a mill tailings slurry will comprise: (1) acidifying a metal cyanide complex-containing waste water or slurry effluent with carbon dioxide in order to produce the general acidification schemes: $H_2CO_3 \rightleftharpoons H^+ + HCO_3^-$ and $HCO_3^- \rightleftharpoons H^+ + CO_3^=$; (2) treating the effluent with a sulfide ion source to produce metal sulfide and cyanide ion from said metal cyanide complex according to the general reaction scheme: metal cyanide complex (e.g., $Me(CN_x^{y-})$) + sulfide ion → metal sulfide + cyanide ion; and (3) adjusting the pH of the metal cyanide complex-containing effluent to from about 4.5 to about 8.0 through the use of said carbon dioxide in order to purge the cyanide ion from the effluent as hydrogen cyanide gas according to the general scheme: $H^+ + CN^- \rightarrow HCN \uparrow$. Once purged, the resulting hydrogen cyanide gas then can be vented (using known safety precautions), but more preferably is recovered and reused as a cyanide source. The recovery step can be carried out through the use of a strong alkaline solution such as that of NaOH according to the general scheme:

$$HCN + NaOH \xrightarrow{H_2O} NaCN + H_2O \text{ and}$$

$$H_2CO_3 + 2NaOH \text{ or } CO_2H_2O$$

Again, the herein disclosed processes are particularly useful in removing cyanide from those mill tailings slurries which contain a metal cyanide complex component (such as those of precious metals and/or base metals having a general formula: $[Me(CN)_x{}^{\nu-}]$ wherein Me is a metal selected from the group consisting of gold, silver, copper, nickel, zinc, cobalt, cadmium, manganese and iron, or combination of such metals, CN is a cyanide species, X is an integer from 1 to 6 and $\nu-$ represents a net ionic charge between 1 and 4.

Applying these processes within the context of treating cyanide/precious metal-containing effluent slurries, a particularly preferred version of these processes would comprise: (1) acidifying a mill tailings slurry with carbon dioxide gas; (2) treating the slurry with a sulfide ion source to produce precious metal sulfide and cyanide ion; (3) adjusting the pH of the slurry to from about 5.5 to about 7.0 in order to purge the cyanide ion from the slurry as hydrogen cyanide gas; (4) scrubbing the hydrogen cyanide gas with an alkaline solution to produce an alkaline salt of the cyanide ion; and (5) recovering the alkaline salt of the cyanide ion for disposal or reuse as a cyanide source for, say, a Merrill-Crowe process. Finally, it should also be noted that the process of this patent disclosure, as opposed to several other prior art processes previously discussed, does not oxidize metals and this circumstance will tend to prevent remobilization of metal ions over long periods of time. This also tends to make final closure of the impoundment much easier.

Various refinements can be made to tailor the above process to particular local circumstances. For example, some of the most preferred embodiments will involve cases wherein the metal cyanide complex component is a gold-containing cyanide complex. However, the herein disclosed process could just as well be applied to a base metal-containing cyanide complex as well as to slurries containing mixtures of a base metal-containing cyanide complex, a precious metal-containing cyanide complex and/or precious metal and base metal-containing cyanide complexes. In cases where base metals are present, addition of sulfide will also serve to precipitate the base metals) and free the complexed cyanide.

Those skilled in this art also will appreciate that the action of carbon dioxide in a water solution will result in production of carbonic acid $H_2CO_3$ in a water slurry. Consequently, the processes of this invention might employ aqueous carbonic acid rather than carbon dioxide gas. However, for many economic and/or practical reasons hereinafter more fully described, carbon dioxide gas is the preferred source of the carbonic acid which normally results from mixing $CO_2$ gas and water. Industrial grade, bottled, carbon dioxide gases are preferred sources of the gas. In some versions of this process, however, $CO_2$ also may even be obtained from combustion gases such as exhaust gases from internal combustion engines or from industrial "stack gases." Regardless of its source, however, the carbon dioxide gas can be introduced into the slurry by injection, sparging, eduction, etc. A highly preferred point of introduction in the context of precious metal mining is prior to the slurry's introduction into a tailings pond. Such a point of introduction is generally depicted in FIG. 1 of this patent application.

In more specific versions of this process (but still bearing in mind the need to maintain a 5.5 to 7 pH range) the $CO_2$ can be added to the slurry before and/or after the sulfide is added. In any event, at least about 1 gram (and preferably from about 4 to about 8 grams) of carbon dioxide will be added per gram of cyanide $CN^-$ to be removed. The removal of metal cyanide complexes from mill tailings in accordance with the processes of this patent disclosure is preferably carried out in a temperature range from about 0° to about 80° C. at a pressure of from about 1 to about 5 atmospheres. The $CO_2$ also can be dispersed into such a tailings slurry as "pure" $CO_2$ gas or as a mixture of from about 5 percent to about 80 percent by volume of another gas such as air, internal combustion engine combustion products and/or other like sources of $CO_2$ gas. Moreover, since such introduction can be by injection, sparging, and eduction, those reactors normally used in flotation cells may also be employed to introduce $CO_2$ into such mill tailings. Finally, since one of the functions of the $CO_2$ is to acidify the slurry, this function can be augmented by the use of other acid reagents such as sulfuric acid, hydrochloric acid, and the like.

The sulfide ion source is preferably sodium sulfide, but other sulfide ion sources such as alkaline hydrosulphide (which is the same as bisulfide), hydrogen sulfide, and similar thiosalts may also be employed. The required amounts of sulfide ingredient(s) can be added separate from, or in conjunction with, $CO_2$ addition. These required amounts will generally be at least about 2 grams of sulfide ion per gram of cyanide complex.

The processes of this patent disclosure can be carried out over a fairly broad pH range. However, as previously noted, a pH range from about 4.5 to about 8.0 (and more preferably from about 5.8 to about 6.5) is highly preferred because this range can be achieved by $CO_2$ acidification and because it is a particularly effective range for volatilizing cyanide as HCN according to the generalized scheme: $H^+ + CN^- \rightarrow HCN$. It should also be noted that use of the rather low 4.5 to 8 pH is particularly convenient when sulfites such as calcium sulfite are present in the slurry because the presence of such a pH range tends to reduce the amount of unreacted sulfite in many metal (e.g., gold or silver) precipitates.

Again, those skilled in this art also will appreciate that mill tailing treated by the herein disclosed processes will normally be large in volume, but relatively low in cyanide concentration. For example, mill tailings from precious metal recovery operations will normally contain from about 20 ppm to about 1,000 ppm cyanide. In such cases the herein disclosed processes are capable of reducing such cyanide concentrations to about 5 ppm (5 milligram per liter) in a treatment time of from about 15 to about 90 minutes using from about 4 to about 8 grams of carbon dioxide gas per gram of cyanide.

In some preferred embodiments of this process, upon being driven from the slurry, the HCN gas is then scrubbed, in scrubbing equipment well known to the art, with any one of a wide variety of commonly available alkali or alkaline-earth metal hydroxides in order to produce a reaction which results in the production of an alkaline salt of the cyanide (e.g., Na CN) with the possible production of an alkaline salt of a carbonate as a possible by-product. Such reactions are preferably carried out in a pH range from about 12 to about 14. Suitable hydroxide scrubbing agents would include, but not be limited to lime, sodium hydroxide, calcium hydroxide, and potassium hydroxide. In general, use of a scrubbing agent having a solution content by weight of from about 0.5% to about 25% is preferred.

The above noted processes also have a great advantage over many others of the prior art in that they can be carried out without a need for any reaction catalysts whatsoever. However, those skilled in this art will appreciate that reactions involving metal cyanide complexes can be catalyzed, especially by various metal ion species (simple and/or complex) such as those of nickel, copper and manganese. Here again, the absence or limited presence of such catalysts visa-vis many prior art processes based upon the use of $SO_2$ gas is an important aspect of this invention because of the huge volumes of mill tailing effluents generated by mining operations. In the same vein, it should also be noted that $CO_2$ gas currently costs only about one-third as much as $SO_2$ gas. If purchased as bottled gas - and far less if obtained by the preferred methods of local generation or use of waste products (off-gases). Hence, the herein disclosed process has many decided economic advantages over those which employ $SO_2$ gas as a means of treating large quantities of cyanide containing mill tailings and especially over those processes wherein limestone is a component of the effluent being treated.

DESCRIPTION OF DRAWING

FIG. I illustrates the application of the herein disclosed process within the context of a typical precious metal recovery operation.

PREFERRED EMBODIMENTS OF THE INVENTION

Figure 1:
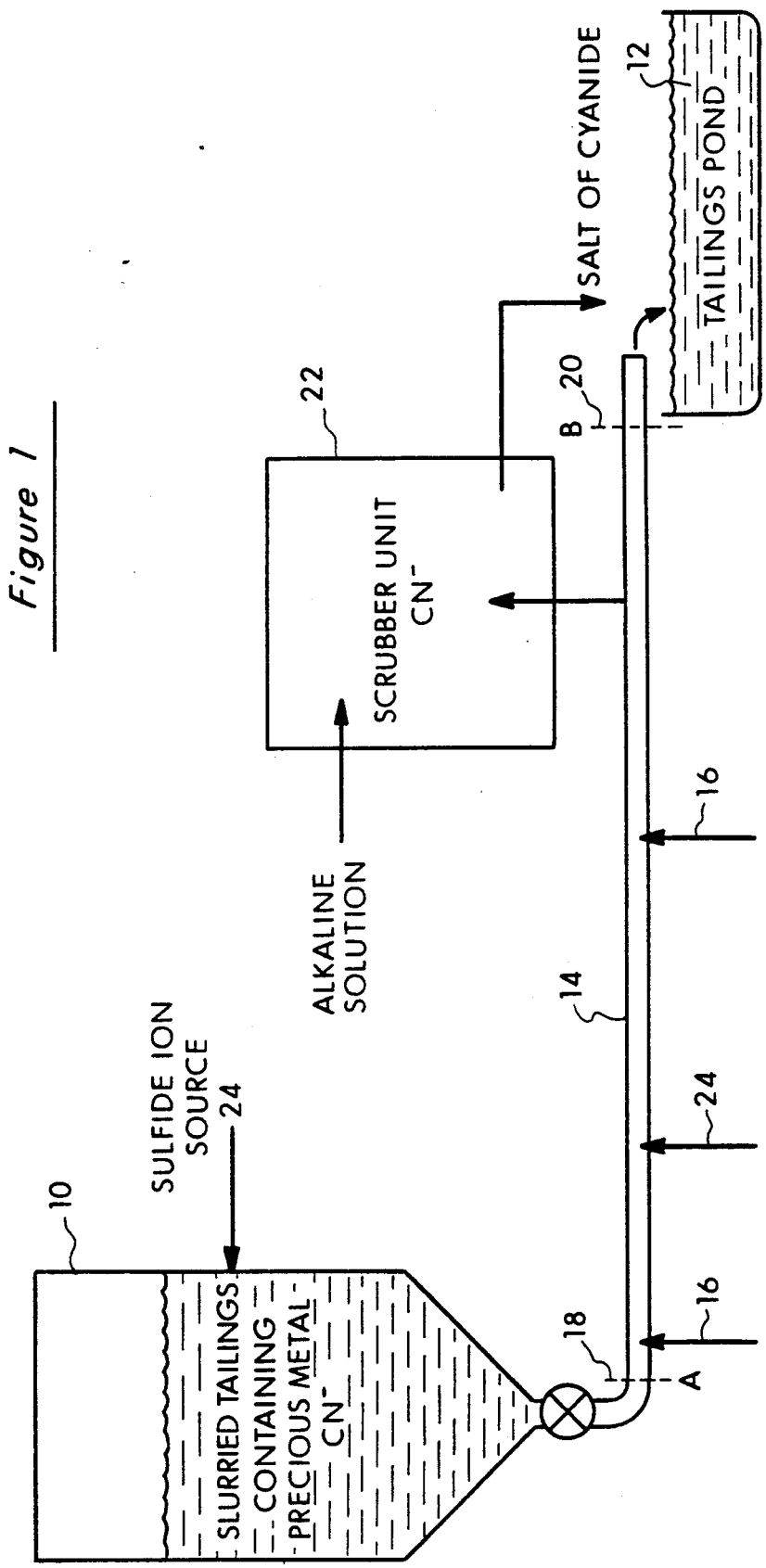

FIG. I illustrates the application of the herein disclosed process to a typical process employed in recovering precious metals wherein a stream of slurried tailings containing a cyanide species is transferred from a tank 10 to a tailings pond 12 via a pipe system 14. The carbon dioxide 16 (gas or liquid carbonic acid) is preferably introduced near some beginning point 18 of the pipe system 14, as opposed to being introduced near some end point 20 in said pipe system so that the carbon dioxide has a longer residence time in the slurry. The flow of the slurry can be controlled to produce residence times (between say beginning point 18 and end point 20) which are preferably from about 15 minutes to about 90 minutes. A scrubber unit 22 is preferably placed near the distant end point 20 of the pipe system 14. The sulfide ion source 24 may be introduced into the process either before or after the carbon dioxide 16 is introduced.

Finally, those skilled in this art will appreciate that the herein disclosed processes may be embodied in several forms without departing from the spirit or essential characteristics thereof and that the above noted embodiments are given in an illustrative sense and not in a restrictive sense; consequently, the scope of this invention is defined by the appended claims rather than by the preceding description and all embodiments that fall within the metes and bounds of the claims or that form their functional equivalents are therefore intended to be embraced by the claims which follow.

Thus having disclosed our invention, we claim:

1. A process for removing cyanide from a mill tailings slurry containing a metal cyanide complex component, said process comprising:
   (1) first acidifying the slurry with carbon dioxide in an amount sufficient to provide from about 4 to about 8 grams of carbon dioxide per gram of cyanide in said metal cyanide complex component;
   (2) thereafter treating the slurry with a sulfide ion source in an amount sufficient to provide at least about 2 grams of sulfide ion per gram of metal cyanide complex component to produce a metal sulfide and a cyanide ion from said metal cyanide complex component;
   (3) adjusting the pH of the slurry to from about 4.5 to about 8.0 in order to purge the cyanide ion from the slurry as hydrogen cyanide gas.

2. The process of claim 1 wherein the metal cyanide complex component is a precious metal-containing cyanide complex component.

3. The process of claim 1 wherein the metal cyanide complex component is a gold-containing cyanide complex component.

4. The process of claim 1 wherein the metal cyanide complex component is a base metal-containing cyanide complex component.

5. The process of claim 1 wherein the carbon dioxide used to acidify the slurry is a gaseous product which is sparged into said slurry.

6. The process of claim 1 wherein the carbon dioxide used to acidify the slurry is introduced as part of a gaseous, carbon dioxide-containing, combustion product which is sparged into the slurry.

7. The process of claim 1 wherein the carbon dioxide used to acidify the slurry is introduced into the slurry as carbonic acid.

8. The process of claim 1 wherein the sulfide ion source is sodium sulfide.

9. A process for recovering cyanide from a mill tailings slurry containing a metal cyanide complex component, said process comprising:
   (1) first acidifying the slurry with carbon dioxide in an amount sufficient to provide from about 4 to about 8 grams of carbon dioxide per gram of cyanide in said metal cyanide complex component;
   (2) thereafter treating the slurry with a sulfide ion source in an amount sufficient to provide a least about 2 grams of sulfide ion per gram of metal cyanide complex component to produce a metal sulfide and a cyanide ion from said metal cyanide complex component;
   (3) adjusting the pH of the slurry to from about 4.5 to about 8.0 in order to purge the cyanide ion from the slurry as hydrogen cyanide gas;
   (4) scrubbing the hydrogen cyanide gas with an alkaline solution to produce an alkaline salt of the cyanide ion; and
   (5) recovering the alkaline salt of the cyanide ion.

10. The process of claim 9 wherein the metal cyanide complex component is a precious metal-containing cyanide complex component.

11. The process of claim 9 wherein the metal cyanide complex component is a gold-containing cyanide complex component.

12. The process of claim 9 wherein the metal cyanide complex component is a base metal-containing cyanide complex component.

13. The process of claim 9 wherein the carbon dioxide used to acidify the slurry is a gaseous product which is sparged into said slurry.

14. The process of claim 9 wherein the carbon dioxide used to acidify the slurry is introduced as part of a gaseous, carbon dioxide-containing, combustion product which is sparged into the slurry.

15. The process of claim 9 wherein the carbon dioxide used to acidify the slurry is introduced into the slurry as carbonic acid.

16. The process of claim 9 wherein the sulfide ion source is sodium sulfide.

17. The process of claim 9 wherein the alkaline solution used to scrub the hydrogen cyanide gas is sodium hydroxide.

* * * * *